US011580517B1

(12) United States Patent
Dietrich et al.

(10) Patent No.: US 11,580,517 B1
(45) Date of Patent: *Feb. 14, 2023

(54) MOBILE DEVICE-BASED DUAL CUSTODY VERIFICATION USING MICRO-LOCATION

(71) Applicant: Wells Fargo Bank, N.A., San Francisco, CA (US)

(72) Inventors: David J. Dietrich, Charlotte, NC (US); Diana Macias, Livermore, CA (US); Jinee K. Ellis, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,311

(22) Filed: May 24, 2021

Related U.S. Application Data

(63) Continuation of application No. 14/980,216, filed on Dec. 28, 2015, now Pat. No. 11,017,376.

(51) Int. Cl.
*G06Q 20/32* (2012.01)
*H04W 4/02* (2018.01)
(Continued)

(52) U.S. Cl.
CPC ....... *G06Q 20/3224* (2013.01); *G06Q 20/223* (2013.01); *G06Q 20/42* (2013.01);
(Continued)

(58) Field of Classification Search
CPC .. G06Q 20/3224; G06Q 20/223; G06Q 20/42; G06Q 20/32; G06Q 20/22;
(Continued)

(56) References Cited

U.S. PATENT DOCUMENTS

| 6,865,215 | B1 | 3/2005 | Russell et al. |
| 6,868,391 | B1 | 3/2005 | Hultgren |

(Continued)

FOREIGN PATENT DOCUMENTS

| AU | 2013246397 B2 * | 2/2018 | ............ G06Q 20/12 |
| GB | 2 488 520 | 9/2012 | |
| WO | WO-2011072015 A1 * | 6/2011 | ............ G06Q 20/32 |

OTHER PUBLICATIONS

Feng Zhang et al., "Location-based Authentication and Authorization Using Smart Phones," 2012, 2012 IEEEE 11th International Conference on Trust, Security and Privacy in Computing and Communications, pp. 1285-1292 (Year: 2012).

(Continued)

*Primary Examiner* — Kenneth Bartley
(74) *Attorney, Agent, or Firm* — Foley & Lardner LLP

(57) ABSTRACT

A method is provided. The method includes receiving a request to conduct a transaction with a merchant, requesting approval of the request, receiving approval of the request, verifying the transaction, receiving a first data, receiving a second data, determining a first distance between the first computing device and the second computing device based on the first and second data, determining that the first distance between the first computing device and second computing device satisfies a first predetermined distance threshold, receiving a third data, the third computing device being associated with the second user, determining a second distance between the third computing device and the second computing device based on the third and second data, determining that the second distance between the third computing device and the second computing device satisfies a second predetermined distance threshold, and approving the transaction.

20 Claims, 4 Drawing Sheets

(51) Int. Cl.
 *G06Q 20/42* (2012.01)
 *G06Q 20/22* (2012.01)
 *H04W 12/04* (2021.01)
 *H04W 16/28* (2009.01)

(52) U.S. Cl.
 CPC ........... *H04W 4/023* (2013.01); *H04W 4/027* (2013.01); *H04W 12/04* (2013.01); *H04W 16/28* (2013.01)

(58) Field of Classification Search
 CPC ..... H04W 4/023; H04W 4/027; H04W 12/04; H04W 16/28; H04W 4/02
 See application file for complete search history.

(56) References Cited

U.S. PATENT DOCUMENTS

| | | | |
|---|---|---|---|
| 6,975,873 B1 | 12/2005 | Banks et al. | |
| 7,424,268 B2 | 9/2008 | Diener et al. | |
| 8,014,756 B1 | 9/2011 | Henderson | |
| 8,166,068 B2* | 4/2012 | Stevens | G06Q 20/40 705/64 |
| 8,295,898 B2 | 10/2012 | Ashfield et al. | |
| 8,296,228 B1 | 10/2012 | Kloor | |
| 8,341,029 B1 | 12/2012 | Ramalingam et al. | |
| 8,365,258 B2 | 1/2013 | Dispensa | |
| 8,401,906 B2 | 3/2013 | Ruckart | |
| 8,606,702 B2 | 12/2013 | Ruckart | |
| 8,646,060 B1 | 2/2014 | Ben Ayed | |
| 8,775,188 B2 | 7/2014 | Deng et al. | |
| 8,793,776 B1 | 7/2014 | Jackson | |
| 8,924,295 B2* | 12/2014 | Aaron | H04W 12/12 705/44 |
| 9,032,498 B1 | 5/2015 | Ben Ayed | |
| 9,125,180 B1 | 9/2015 | Hamilton et al. | |
| 9,204,251 B1 | 12/2015 | Mendelson | |
| 9,380,421 B1 | 6/2016 | Vltavsky | |
| 9,456,348 B2 | 9/2016 | Dennis et al. | |
| 9,525,971 B1 | 12/2016 | Vega et al. | |
| 9,547,859 B2 | 1/2017 | Patel et al. | |
| 9,659,296 B2 | 5/2017 | Patel | |
| 9,875,473 B2 | 1/2018 | Patel | |
| 9,967,713 B2 | 5/2018 | Buchheim et al. | |
| 10,217,151 B1 | 2/2019 | Greiner et al. | |
| 10,275,823 B2 | 4/2019 | Lanpher et al. | |
| 10,445,739 B1 | 10/2019 | Sahni et al. | |
| 10,592,883 B2 | 3/2020 | Priebatsch | |
| 11,062,314 B1* | 7/2021 | Ramanathan | G06Q 20/3224 |
| 2004/0160908 A1 | 8/2004 | Perlman | |
| 2004/0213170 A1 | 10/2004 | Bremer | |
| 2005/0136845 A1 | 6/2005 | Masuoka et al. | |
| 2006/0067418 A1 | 3/2006 | Girardeau et al. | |
| 2006/0178986 A1 | 8/2006 | Giordano et al. | |
| 2007/0055785 A1* | 3/2007 | Stevens | G06Q 20/3224 709/229 |
| 2007/0084913 A1 | 4/2007 | Weston | |
| 2007/0197256 A1 | 8/2007 | Lu et al. | |
| 2008/0109301 A1 | 5/2008 | Yee et al. | |
| 2008/0148346 A1 | 6/2008 | Gill et al. | |
| 2008/0222038 A1 | 9/2008 | Eden et al. | |
| 2008/0233938 A1 | 9/2008 | Bradley et al. | |
| 2008/0242311 A1 | 10/2008 | Craine et al. | |
| 2008/0313047 A1 | 12/2008 | Casares et al. | |
| 2009/0011713 A1 | 1/2009 | Abusubaih et al. | |
| 2009/0076911 A1 | 3/2009 | Vo et al. | |
| 2009/0157547 A1 | 6/2009 | Ruckart | |
| 2009/0299825 A1 | 12/2009 | Olawski et al. | |
| 2009/0320088 A1 | 12/2009 | Gill et al. | |
| 2010/0051684 A1 | 3/2010 | Powers | |
| 2011/0092185 A1 | 4/2011 | Garskof | |
| 2011/0137804 A1 | 6/2011 | Peterson | |
| 2011/0191254 A1 | 8/2011 | Womack | |
| 2011/0320291 A1 | 12/2011 | Coon | |
| 2012/0054105 A1 | 3/2012 | Seo | |
| 2012/0086549 A1 | 4/2012 | Barnes, Jr. | |
| 2012/0173429 A1* | 7/2012 | Stevens | G06Q 20/403 705/44 |
| 2012/0173431 A1 | 7/2012 | Ritchie et al. | |
| 2012/0191566 A1 | 7/2012 | Sayan | |
| 2012/0246703 A1 | 9/2012 | MacLeod et al. | |
| 2012/0268241 A1* | 10/2012 | Hanna | H04L 63/0861 340/5.52 |
| 2012/0290376 A1 | 11/2012 | Dryer et al. | |
| 2013/0046634 A1 | 2/2013 | Grigg et al. | |
| 2013/0046692 A1* | 2/2013 | Grigg | G06Q 40/00 705/44 |
| 2013/0082103 A1* | 4/2013 | Aaron | G06Q 20/3224 235/380 |
| 2013/0097079 A1 | 4/2013 | Bruder | |
| 2013/0132277 A1 | 5/2013 | Naqvi | |
| 2013/0132430 A1 | 5/2013 | Platt et al. | |
| 2013/0151415 A1 | 6/2013 | Ruckart | |
| 2013/0290119 A1 | 10/2013 | Howe et al. | |
| 2013/0309971 A1 | 11/2013 | Kiukkonen et al. | |
| 2013/0332358 A1* | 12/2013 | Zhao | G06Q 20/34 705/44 |
| 2014/0056165 A1 | 2/2014 | Siomina et al. | |
| 2014/0112320 A1 | 4/2014 | Makhlouf et al. | |
| 2014/0149241 A1 | 5/2014 | Neuneker et al. | |
| 2014/0157381 A1 | 6/2014 | Disraeli | |
| 2014/0173755 A1 | 6/2014 | Wahl | |
| 2014/0244499 A1 | 8/2014 | Gruner | |
| 2014/0337216 A1 | 11/2014 | Anand | |
| 2015/0100488 A1 | 4/2015 | Dua | |
| 2015/0121544 A1 | 4/2015 | He | |
| 2015/0170131 A1 | 6/2015 | Patel | |
| 2015/0170132 A1 | 6/2015 | Patel | |
| 2015/0200925 A1 | 7/2015 | Lagerstedt et al. | |
| 2015/0312762 A1 | 10/2015 | Hernandez et al. | |
| 2015/0324831 A1 | 11/2015 | Barua et al. | |
| 2015/0332248 A1* | 11/2015 | Weksler | H04W 24/08 726/3 |
| 2015/0356563 A1 | 12/2015 | Vohra et al. | |
| 2016/0019526 A1 | 1/2016 | Granbery et al. | |
| 2016/0096508 A1* | 4/2016 | Oz | H04L 63/08 701/36 |
| 2016/0189132 A1 | 6/2016 | Cash et al. | |
| 2017/0116612 A9 | 4/2017 | Naqvi | |
| 2017/0303132 A1 | 10/2017 | Naqvi | |
| 2018/0365677 A1 | 12/2018 | Baldie | |
| 2022/0172210 A1* | 6/2022 | Henderson | G06Q 20/327 |

OTHER PUBLICATIONS

Heritage Bank, "Online Banking Fraud Protection", https://www.bankonheritage.com/securitytipsandinformation/?print=print, (May 17, 2015).
Wells Fargo Bank, N.A., "Dual custody: A best practice in reducing fraud risk", 2014, http://webcache.googleusercontent.com/search?q=cache:mtNSPIVOa8J: https://www08.wellsfargomedia.com/downloads/pdf/com/fraud/DualCustodyFactsAnd... (May 15, 2015).

\* cited by examiner

US 11,580,517 B1

MOBILE DEVICE-BASED DUAL CUSTODY VERIFICATION USING MICRO-LOCATION

CROSS-REFERENCE TO RELATED APPLICATION

This application is a continuation of U.S. patent application Ser. No. 14/980,216, filed Dec. 28, 2015, which is incorporated by reference herein in its entirety.

TECHNICAL FIELD

The present disclosure relates generally to the fields of transaction verification and fraud prevention.

BACKGROUND

Online fraud is a serious threat to modern companies. For example, fraudsters may employ online fraud schemes to attempt to obtain confidential information (e.g., passwords, personal ID numbers, token codes, etc.), and use such information to access financial accounts, transfer money, make unauthorized purchases, etc. Online fraud may be initiated both internally (e.g., by a rogue employee) or externally (e.g., by a hacker).

SUMMARY

One example embodiment relates to a computer-implemented method. The method includes receiving a transaction initiation request from a first user via a first computing device. A first micro-location parameter relating to a micro-location of the first computing device is received. Approval of the transaction initiation request is requested from a second user via a second computing device. Approval of the transaction initiation request is received from the second user via the second computing device. A second micro-location parameter relating to a micro-location of the second computing device is received. The transaction is approved if the micro-locations of the first and second computing devices indicate that the first and second computing devices are at least a predetermined distance from each other.

Another example embodiment relates to a transaction processing system. The system includes a plurality of beacons positioned at different physical locations. Each of the plurality of beacons includes a transmitter configured to transmit a beacon identifier. Each of the plurality of beacons is associated with a unique beacon identifier. The system also includes a computing system. The computing system includes a network interface configured to facilitate operative communication between the computing system and first and second computing devices via a network. The computing system also includes memory and a processor. The processor is configured to receive a transaction initiation request from a first user via the first computing device. A first beacon identifier of a first beacon of the plurality of beacons is received. The first beacon identifier relates to a micro-location of the first computing device. Approval of the transaction initiation request is requested from a second user via the second computing device. Approval of the transaction initiation request is received from the second user via the second computing device. A second beacon identifier of a second beacon of the plurality of beacons is received. The second beacon identifier relates to a micro-location of the second computing device. The transaction is approved if the micro-locations of the first and second computing devices indicate that the first and second computing devices are at least a predetermined distance from each other.

Another example embodiment relates to a transaction processing system. The transaction processing system includes a plurality of beacons positioned at different physical locations. Each of the plurality of beacons includes a transmitter configured to transmit a beacon identifier. Each of the plurality of beacons is associated with a unique beacon identifier. The transaction processing system also includes a server system. The server system includes a processor and instructions stored in non-transitory machine-readable media. The instructions are configured to cause the server system to receive a transaction initiation request from a first user via the first computing device. A first beacon identifier of a first beacon of the plurality of beacons is received. The first beacon identifier relates to a micro-location of the first computing device. Approval of the transaction initiation request is requested from a second user via the second computing device. Approval of the transaction initiation request is received from the second user via the second computing device. A second beacon identifier of a second beacon of the plurality of beacons is received. The second beacon identifier relates to a micro-location of the second computing device. The transaction is approved if the micro-locations of the first and second computing devices indicate that the first and second computing devices are at least a predetermined distance from each other.

Figure 1:
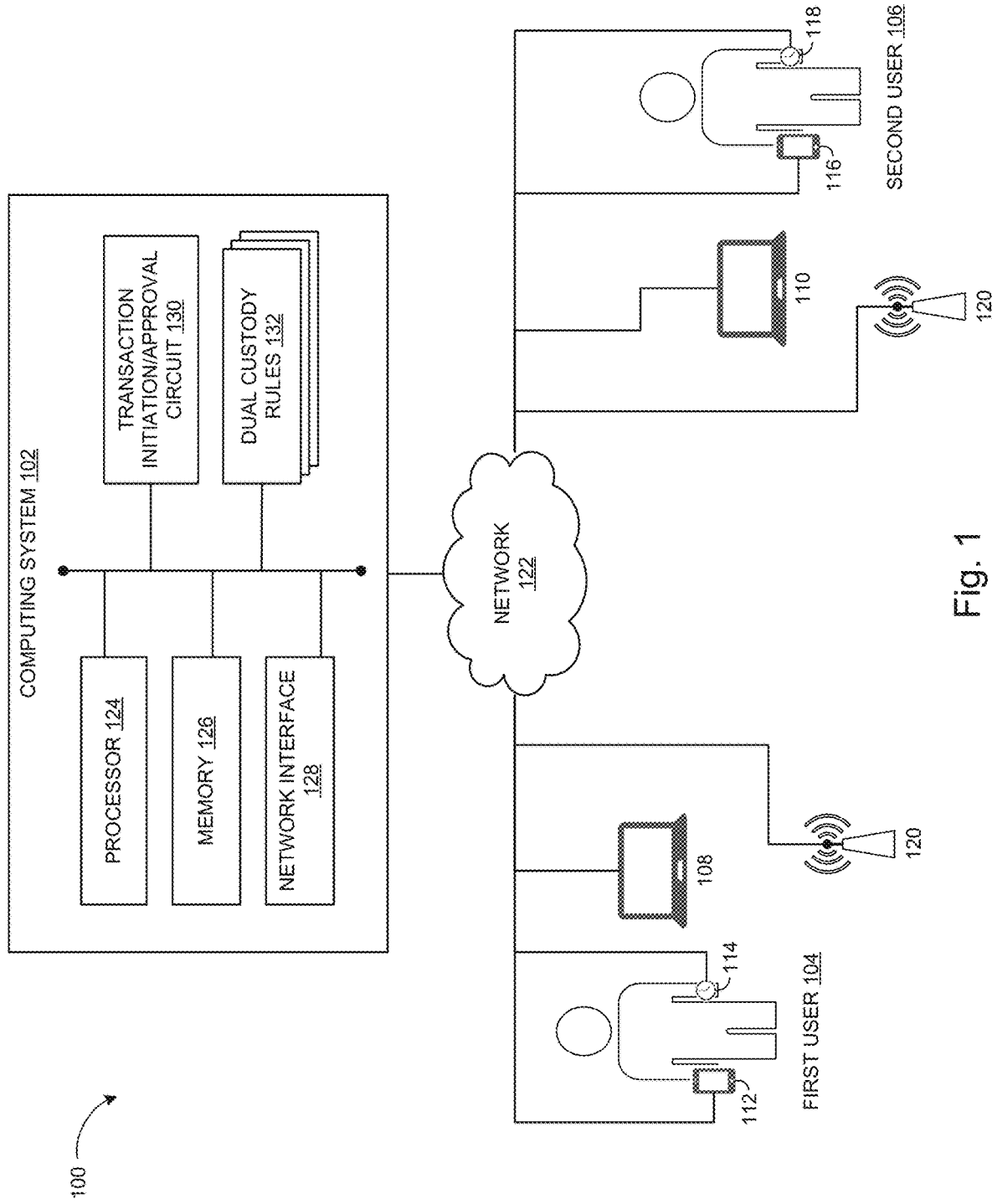
FIG. 1 is a block diagram of a transaction processing system, according to an example embodiment.

The details of one or more implementations are set forth in the accompanying drawings and the description below. Other features, aspects, and advantages of the disclosure will become apparent from the description, the drawings, and the claims.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Dual custody is one tool that may be used to minimize fraud risks for a company. Dual custody requires two users to execute certain transactions, such as payments or administrative changes. In dual custody arrangements, a first user initiates a transaction, and a second user must approve the transaction before the transaction is completed. Separating user tasks provides an additional layer of security to protect against fraud. For example, dual custody prevents a rogue employee from making unauthorized transactions (e.g., payments) to himself or herself without another individual's approval. Additionally, even if a fraudster is able to coax access credentials from a user who initiates a transaction, it is less likely that the fraudster would also obtain credentials from the user who must approve and release the transaction.

For dual custody to be effective, the first user (the initiator) and the second user (the approver) must be different people. One way to ensure this is to require that a transaction is initiated on a first computer and approved on a different second computer. This may be monitored via IP addresses of the computers or in other ways. However, IP addresses may be spoofed such that a data packet sent from a first computer can appear to have been sent by a second computer. Therefore, even if dual custody systems are in place, they may be vulnerable to hacking or misuse.

Referring generally to the figures, systems and methods for verifying dual custody authorization using micro-location are described. According to various example embodiments, micro-location refers to a location measurement with a high degree of precision and/or accuracy. Micro-location may be determined using one or more technologies, such as beacons, NFC, RFID, WiFi, cellular, machine vision, GPS, etc. Conventional location-based measurements (e.g., civilian GPS) may be capable of determining the general location of an object within approximately ±30 meters. Micro-location, on the other hand, may be capable of determining the location of an object within several meters or less, or in some situations, within a meter or less. Further, micro-location may be expressed in three-dimensions, whereas conventional location-based measurements are typically expressed in two dimensions. For example, while GPS may be capable of determining a particular building in which an object is located, micro-location technologies may be capable of determining the precise location of an object within the building, including the particular floor of the building on which the object is located. Micro-location technologies may also overcome many limitations associated with conventional location-based technologies, such as GPS. For example, GPS requires a line-of-sight to satellites, which may be obstructed in certain situations, such as within some buildings (e.g., office buildings, hospitals, etc.). Micro-location technologies, on the other hand, may not require line-of-sight between transmitters and receivers in certain implementations. In other implementations, micro-location technologies transmitters (e.g., beacons) are placed throughout a physical location (e.g., building) so that line-of-sight between the transmitters and receivers is not a problem.

Various example embodiments are described herein as being implemented via operative communication between a computing device and a beacon to determine the micro-location of the computing device. However, it should be understood that in other example embodiments, other micro-location technologies, such as those described above, may be similarly used. In various example embodiments, one micro-location technology (e.g., beacons) may be augmented by one or more other micro-location technologies (e.g., WiFi, cellular, etc.).

According to various example embodiments, a transaction is initiated by a first user via a first computing device and is approved by a second user via a second computing device. Micro-locations of the first and second computing devices may be determined via operative communication between the respective device and one or more beacons. For example, beacons may each transmit unique beacon identifiers, which may be detected by devices within a certain distance of the beacon. The beacon identifiers and/or other micro-location parameters can be analyzed to determine a micro-location of the corresponding device. In one example embodiment, the beacon identifiers are transmitted to a computing system (e.g., in connection with a transaction initiation request or a transaction approval response), and are analyzed by the computing system to verify compliance with dual custody rules.

The computing system may define various dual custody rules relating to micro-location and other factors to verify that dual custody approval is not fraudulent. For example, in one example embodiment, the dual custody rules may require that the first and second computing devices are at least a predetermined distance away from each other so as to ensure that the first and second computing devices are not the same device. In another example embodiment, the dual custody rules may require that the micro-locations of the first computing device and another device (e.g., a mobile or wearable device) associated with the first user are within a predetermined distance from each other so as to ensure that the first user is actually using the first computing device, and that the micro-locations of the second computing device and another device (e.g., a mobile or wearable device) associated with the second user are within a predetermined distance of each other so as to ensure that the second user is actually using the second computing device. In other example embodiments, characteristics of the micro-location data may be analyzed for peculiarities, such as whether the velocity of one of the devices or users is unusual.

According to various example embodiments, as described in further detail below, verification of dual custody using micro-location provides enhanced granularity to dual custody systems to ensure that the systems are not being fraudulently used. In particular, systems and methods described herein provide a technical solution to the computer-centric and internet-centric challenge of fraudsters posing as different users so that they can approve their own transactions, thereby circumventing dual custody requirements. The problem arises out of the use of computers because one person can use two computing devices in an attempt to fraudulently appear to be two people. The problem also arises out of the use of computers, and particularly out of the use of computers over the internet, because one person can also use a single computing device in an attempt to fraudulently appear to be using two different computing devices. In various example embodiments, this computer-centric and internet-centric challenge is addressed by receiving and analyzing micro-location parameters (e.g., detected beacon identifiers) from individual computing devices involved in initiating and approving a transaction—whether involved directly (e.g., computing devices from which transactions are initiated and approved) and/or indirectly (e.g., computing devices associated with the initiating and approving users)—so as to ensure that transaction initiating users and transaction approving users are in fact different individuals operating on different computing devices.

FIG. 1 is a block diagram of a transaction processing system 100, according to an example embodiment. The transaction processing system 100 is configured to manage various types of transactions, such as payments (e.g., ACH payments, wire transfers, bill payments, etc.), administrative changes (e.g., changes to employee records, permissions, access lists, work groups, etc.), and other transactions. The transaction processing system 100 may be operated and managed by any of various types of entities, such as FIs (e.g., consumer and commercial banks, insurance companies, investment banks, brokerage firms), other types of companies, organizations, educational institutions, government entities, etc., or any other entity that engages in transactions that may be susceptible to fraud. According to various example embodiments, the transaction processing system 100 may include a physical location, such as an office building, retail store, manufacturing plant, warehouse, campus, etc.

The transaction processing system 100 includes a computing system 102. The computing system 102 is structured to determine whether a transaction requires dual custody approval, and to facilitate dual custody approval for such transactions. Transactions may be initiated by various users, such as a first user 104, and may be approved by various other users, such as a second user 106. For the sake of clarity and brevity, the first user 104 is described herein as a transaction initiating user and the second user 106 is described herein as a transaction approving user. However, it should be understood that although only two users are shown in FIG. 1, the transaction processing system 100 may include many users who may initiate and/or approve transactions.

The first and second users 104, 106 may initiate or approve transactions in various ways using any of various types of devices. For example, the first user 104 may initiate a transaction via a first computing device 108 (e.g., a laptop or desktop computer). Similarly, the second user 106 may approve a transaction from a second computing device 110. In some example embodiments, the first user 104 may initiate transactions via a first mobile device 112 (e.g., smartphone, tablet, etc.) or a first wearable device 114 (e.g., smart watch, smart eyewear, smart clothing, activity tracker, etc.). Similarly, the second user 106 may approve transactions via a second mobile device 116 (e.g., smartphone, tablet, etc.) or a second wearable device 118 (e.g., smart watch, smart eyewear, smart clothing, activity tracker, etc.). As will be appreciated, the first and second mobile devices 112, 116, as well as the first and second wearable devices 114, 118, may also be utilized in other ways, such as to indicate a micro-location of the respective first and second users 104, 106.

The transaction processing system 100 also includes a plurality of beacons 120. The plurality of beacons 120 may be positioned about a physical location (e.g., an office in which the computing system 102 operates). Each of the plurality of beacons may be in operative communication with any of the computing system 102, the first and second computing devices 108, 110, the first and second mobile devices 112, 116, the first and second wearable devices 114, 118, and other systems and devices, directly and/or via a network 122. The network 122 may include one or more of the Internet, a cellular network, Wi-Fi, Wi-Max, a proprietary banking network, or any other type of wired or wireless network. As will be appreciated, operative communication between the plurality of beacons 120 and the other devices may be utilized to determine micro-locations of the respective devices. The computing system 102 may utilize the determined micro-locations of the respective devices to manage dual custody approval of transactions.

According to various example embodiments, the beacons 120 may broadcast certain types of data, such as unique beacon identifiers, to nearby devices via a wireless communications protocol, such as Bluetooth Low Energy (BLE). In other example embodiments, a beacon 120 may transmit a unique beacon identifier to a device via a near-field communication (NFC) signal (e.g., upon tapping the device against the beacon 120). The unique beacon identifier may be used to determine the device's micro-location. In some example embodiments, the device that receives the beacon identifier transmits the beacon identifier to the computing system 102, and the computing system 102 analyzes the beacon identifier to determine the micro-location of the device. In other example embodiments, the device that receives the beacon identifier includes program logic to determine its own micro-location based on the beacon identifier. In some example embodiments, the device may utilize received signal strength indicator (RSSI) measurements in connection with receiving a beacon identifier to determine the proximity of the device relative to a beacon. In some example embodiments, a device may receive beacon identifiers from two or more different beacons 120.

Various example embodiments include safeguards to prevent fraudsters from attempting to hack or spoof the beacons 120. In some example embodiments, the beacon identifiers that are transmitted by the beacons 120 may be periodically rotated. For example, the computing system 120 may utilize a cryptosystem (e.g., RSA) that changes the beacon identifiers at a fixed time interval in a pattern based on a private key safely stored in the computing system 102 or the beacon 120. Therefore, even if a fraudster is able to sniff a beacon identifier, the beacon identifier will be useless after a short time period after which the beacon identifier is rotated to a new value.

In some example embodiments, the computing system 102 may analyze additional factors to determine if a device (e.g., any of the first and second computing devices 108, 110, the first and second mobile devices 112, 116, and the first and second wearable devices 114, 118) is actually within the range of one of the beacons 120. For example, the computing system 102 may maintain a database of the locations of known static devices (e.g., WiFi access points), which may be utilized to verify the location of one of the beacons 120. In addition, the computing system 102 may consider whether the device has passed other beacons 120 or other devices (e.g., WiFi access points) that are near the particular beacon 120.

In some example embodiments, the beacons 120 are configured with authentication and encryption functionality. Instead of simply transmitting beacon identifiers, the beacons 120 may be configured to connect with a device (e.g., any of the first and second computing devices 108, 110, the first and second mobile devices 112, 116, and the first and second wearable devices 114, 118), and the beacon 120 and the device may authenticate with each other. For example, the devices may be pre-authorized to operate with the computing system 102. Upon authenticating with a device, the beacon 120 may encrypt the beacon identifier and transmit the encrypted beacon identifier to the device. The transmitted beacon identifier may be valid only for the device that received it, and that was authenticated to the beacon 120. Accordingly, the encrypted beacon identifier cannot simply be sent to another device and then re-transmitted from a second location.

The computing system 102 may also protect against more low-tech attempts at defrauding the computing system 102. For example, a fraudster may simply attempt to physically move one of the beacons 120 from a first location to a second location. The computing system 102 may prevent this type of fraudulent activity by tracking movement of the beacon 120 and disabling micro-location determinations from a beacon that has been moved. For example, the computing system 102 may continually monitor the proximity of other known devices to the beacons 120 to determine if the beacon has been moved.

Micro-location may be determined in relative or absolute terms. For example, the micro-location of a device may be determined relative to a particular beacon 120 (e.g., within five feet of beacon AAA). In some example embodiments, the physical locations of the beacons 120 are known by the computing system 102, and may be utilized to determine an absolute position of a device. For example, a device may receive beacon identifiers from two or more different beacons 120, and the micro-location of the device may be determined based on the received beacon identifiers. In some example embodiments, the micro-location of the device may be determined based on other data (e.g., GPS, WiFi, etc.), in addition to or instead of the beacon identifiers.

The computing system 102 may include a computer system (e.g., one or more servers each with one or more processing circuits), each including a processor 124 and memory 126. The memory 126 may store various program circuits (e.g., the transaction initiation/approval circuit 130) that, when executed by the processor 124, control the operation of the computing system 102. The memory 126 may include any combination of RAM, ROM, NVRAM, or the like. The computing system 102 may also include a network interface 128, a transaction initiation/approval circuit 130, and dual custody rules 132. The network interface 128 facilitates data communications to and from other devices within and outside of the transaction processing system 100, over the network 122. The network interface 128 may include a wired or wireless network interface (e.g., Ethernet, 802.11X, Bluetooth, BLE, NFC, RFID, ZigBee, etc.).

The transaction initiation/approval circuit 130 is structured to facilitate transactions based on the dual custody rules 132. The dual custody rules 132 may define the parameters by which transactions are processed, such as whether or not a transaction is subject to a dual custody requirement. For example, in some example embodiments, dual custody approval is required only for certain types of transactions. For example, the dual custody rules 132 may define whether dual custody is required based on transaction type (e.g., ACH payment, wire transfer, administrative change, etc.), transaction amount, transaction recipient, user credentials, requested access or permission changes, etc. The dual custody rules 132 may also define particular users to approve certain types of transaction initiation requests. For example, certain transactions (e.g., based on type, amount, etc.) may require approval from a higher-level employee than others.

The dual custody rules 132 may also define various other dual custody approval requirements, such as micro-location requirements. In one example embodiment, the dual custody rules 132 may define that the device at which the transaction is initiated is different than the device at which the transaction is approved. For example, a transaction may be initiated by the first user 104 via the first computing device 108, and may be approved by the second user 106 via the second computing device 110. In this example, the computing system 102 may specify that beacon identifiers received from the first and second computing devices 108, 110 indicate that the first and second computing devices 108, 110 are physically located at least a predetermined distance away from each other.

In another example embodiment, the dual custody rules 132 may define that the transaction initiating user and the transaction approving user are physically located at least a predetermined distance away from each other so as to ensure that the purported transaction initiating and approving users are not the same user. For example, a transaction may be initiated by the first user 104, who may be identified as being associated with the first mobile device 112 and/or the first wearable device 114, and the transaction may be approved by the second user 106, who may be identified as being associated with the second mobile device 116 and/or the second wearable device 118. The computing system 102 may receive beacon identifiers from the first and second mobile devices 112, 116 and/or the first and second wearable devices 114, 118, and may analyze the received beacon identifiers to ensure that the first and second users 104, 106 are physically located at least a predetermined distance away from each other.

In a further example embodiment, the dual custody rules 132 may define that the transaction initiating user is physically located at the device from which the transaction was initiated and that the transaction approving user is physically located at the device from which the transaction is approved. The dual custody rules 132 may further define that those devices must be physically located at least a predetermined distance from each other. For example, a transaction may be initiated by the first user 104 via the first computing device 108, and the transaction may be approved by the second user 106 via the second computing device 110. The first user 104 may be identified as being associated with the first mobile device 112 and the second user 106 may be identified as being associated with the second mobile device 116. The computing system 102 may receive beacon identifiers from the first and second mobile devices 112, 116 and/or the first and second mobile devices 112, 116, and may analyze the received beacon identifiers to ensure that the first computing device 108 is physically located within a predetermined distance from the first mobile device 112, and that the second computing device 110 is physically located within a predetermined distance from the second mobile device 116. For example, the beacon identifiers received from the first computing device 108 and the first mobile device 112 may be the same, and the beacon identifiers received from the second computing device 110 and the second mobile device 116 may be the same.

In another example embodiment, the dual custody rules 132 may define requirements related to other characteristics of the micro-locations, such as prohibiting certain peculiarities related to micro-location. For example, the dual custody rules 132 may define that the velocity of one of the users or devices must be less than a predetermined value. In some embodiments, detection of peculiarities may not be fatal to transaction approval, but may instead trigger enhanced requirements, such as verifying location via additional devices or micro-location technologies, or requiring additional authentication levels or factors.

In some example embodiments, the dual custody rules 132 may define time-based rule parameters. For example, in some embodiments, a transaction request initiated by the first user 104 must be approved by the second user 106 within a predetermined time period. The predetermined time period may be defined such that the first user 104 cannot simply initiate the transaction at the first computing device 108 at a first location, travel to a second location, and approve the transaction from the second computing device 110 at the second location. In some embodiments, the predetermined time period is dynamic based on the physical distance between the first and second locations. For example, if the first and second locations are 100 miles away, the predetermined time period may be one hour. However, if the first and second locations are in different areas of the same building, the predetermined time period may be 30 seconds.

In some example embodiments, the location of the first user 104 is re-verified upon receiving approval from the second user 106. For example, upon the second user 106 approving the transaction request, the computing system 102 may transmit a re-verification request to the first mobile device 112 of the first user 104. In some embodiments, the first mobile device 112 responds to the re-verification request with its location without requiring further input from the first user 104. However, in other embodiments, the first user 104 must affirmatively respond to the re-verification request. The response may include a biometric (e.g., fingerprint or retina) scan, or may require a password or PIN to be entered, etc., so as to verify that the first user 104 is in fact at the same location as the first mobile device 112. Re-verification by the first user 104 may be required to occur within a shorter time period than the initial approval, because the first user 104 would likely expect to be receiving the re-verification request for the transaction that he or she initiated a short time earlier. If the first user 104 does not respond to the re-verification request, another request may be sent to the second user 108, to give the first user 104 another attempt to re-verify his or her position within the re-verification time period.

Figure 2:
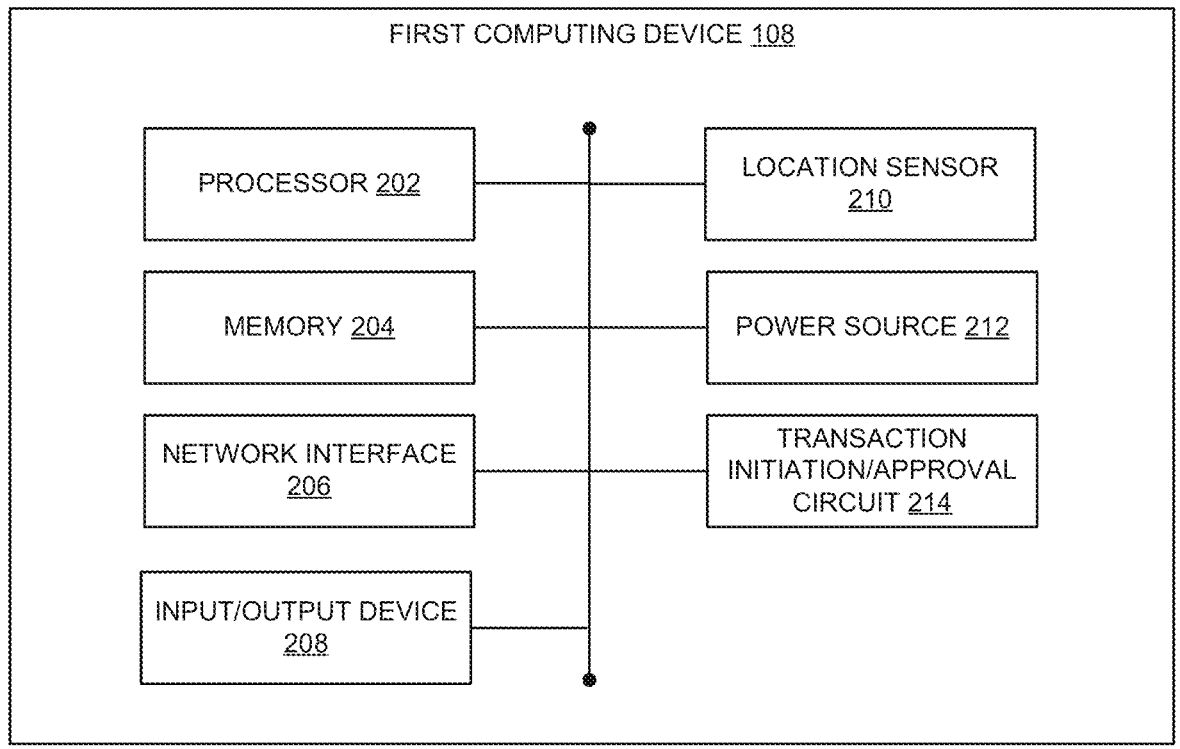
FIG. 2 is a block diagram of the first computing device of the transaction processing system of FIG. 1.

FIG. 2 is a block diagram of the first computing device 108 of the transaction processing system 100 of FIG. 1. It should be understood that the second computing device 110 may be structured similarly to the first computing device 108. As mentioned above, the first computing device 108 may be a laptop or desktop computer, or other types of computing devices. The first computing device 108 may be used by a user (e.g., the first user 104 of FIG. 1) to initiate and/or approve transactions. As will be appreciated, according to various embodiments, transactions may also be initiated and/or approved via any of the first and second mobile devices 112, 116, and the first and second wearable devices 114, 118, among other systems and devices.

According to various embodiments, the first and second mobile devices 112, 116, and the first and second wearable devices 114, 118 may also be structured similar to the first computing device 108. In some example embodiments, transactions may be initiated and/or approved via any of the first and second mobile devices 112, 116, and the first and second wearable devices 114, 118, in a similar manner as with the first computing device 108. In some example embodiments, one or more of the first and second mobile devices 112, 116, and the first and second wearable devices 114, 118 are not used to initiate or approve transactions, but are instead used to determine the micro-location of a user (e.g., one of the first and second users 104, 106) associated with the respective device.

Referring to FIG. 2, the first computing device 108 may include one or more of a processor 202, memory 204, a network interface 206, an input/output device 208, a location sensor 210, a power source 212, and a transaction initiation/approval circuit 214. The memory 204 may store various program circuits (e.g., the transaction initiation/approval circuit 214) that, when executed by the processor 202, control the operation of the first computing device 108. The memory 204 may include any combination of RAM, ROM, NVRAM, or the like.

The network interface 206 facilitates operative communication between the first computing device 108 and the computing system 102, and/or with any of the first and second mobile devices 112, 116, the first and second wearable devices 114, 118, the beacons 120, and other systems and devices, directly and/or via the network 122. The network interface 206 may include a wired or wireless network interface, or a combination thereof. For example, the network interface 206 may include any of various types of wired or wireless network transceivers (e.g., Ethernet, 802.11X, Bluetooth, NFC, Bluetooth Low Energy (BLE), RFID, NFC, ZigBee, etc.), cellular transceivers (e.g., CDMA, GSM, LTE, etc.), or a combination thereof (e.g., both a cellular transceiver and a Bluetooth transceiver).

The input/output device 208 is configured to receive information from a user and to present information to the user. The input/output device 208 may be a single integrated device (e.g., a touchscreen display device), or may be discrete devices (e.g., a display device and a keyboard). For example, the input/output device may include any of display devices, keyboards, buttons, speakers, biometric sensors (e.g., fingerprint or retina scanners), notification LEDs, microphones, sensors, switches, cameras, or a combination thereof.

The location sensor 210 may be included in some example embodiments, and may be configured to determine the micro-location of the first computing device 108 instead of or in addition to determining micro-location via beacon identifiers. For example, the location sensor 210 may include a GPS sensor or another type of location sensor. Additionally or alternatively, the location sensor 210 may include a program circuit to determine the micro-location of the first computing device 108 based on other data, such as beacon identifiers received from the beacons 120; cellular, GPS, and/or WiFi triangulation; IP address, etc. In some example embodiments, location data (e.g., a unique beacon identifier) is transmitted from the first computing device 108 to the computing system 102, and the computing system 102 determines the micro-location of the first computing device 108 based on the received location data.

The power source 212 may include any combination of grid power and battery power. In configurations in which the power source 212 includes battery power, the first computing device 108 may also include the necessary circuitry to recharge the battery.

The transaction initiation/approval circuit 214 is configured to present and receive data to and from a user regarding transactions that are to be initiated or approved. In one example embodiment, the transaction initiation/approval circuit 214 includes an application provided by the entity that manages the transaction processing system 100.

Figure 3:
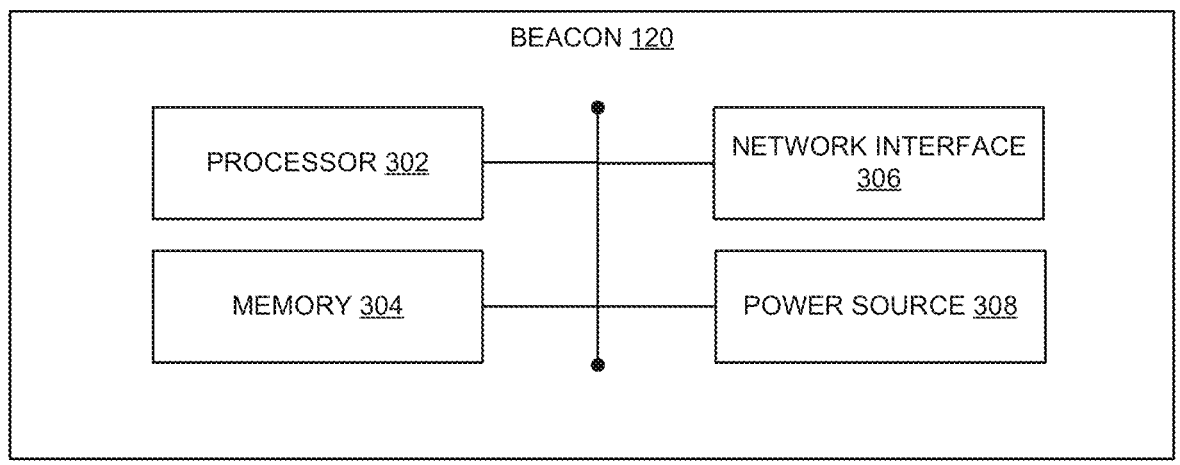
FIG. 3 is a block diagram of one of the plurality of beacons of the transaction processing system of FIG. 1.

FIG. 3 is a block diagram of one of the plurality of beacons 120 of the transaction processing system 100 of FIG. 1, according to an example embodiment. The beacon 120 may include one or more of a processor 302, memory 304, a network interface 306, and a power source 308. The memory 304 includes program circuits that, when executed by the processor 302, control the operation of the beacon 120. The memory 304 may include any combination of RAM, ROM, NVRAM, or the like. The unique beacon identifier may be programmed into the memory 304. According to various example embodiments, the network interface 306 may include a transmitter configured to broadcast the unique beacon identifier of the beacon 120 (e.g., via Bluetooth, BLE, etc.). In some example embodiments, the network interface 306 includes a transceiver capable of both sending and receiving data transmissions. In some example embodiments, the beacon 120 may receive a device identifier from a device and may transmit the device identifier to the computing system 102 rather than the device transmitting the beacon identifier to the computing system 102. The beacon 120 also includes a power source 308, which may include any combination of grid power and battery power.

Figure 4:
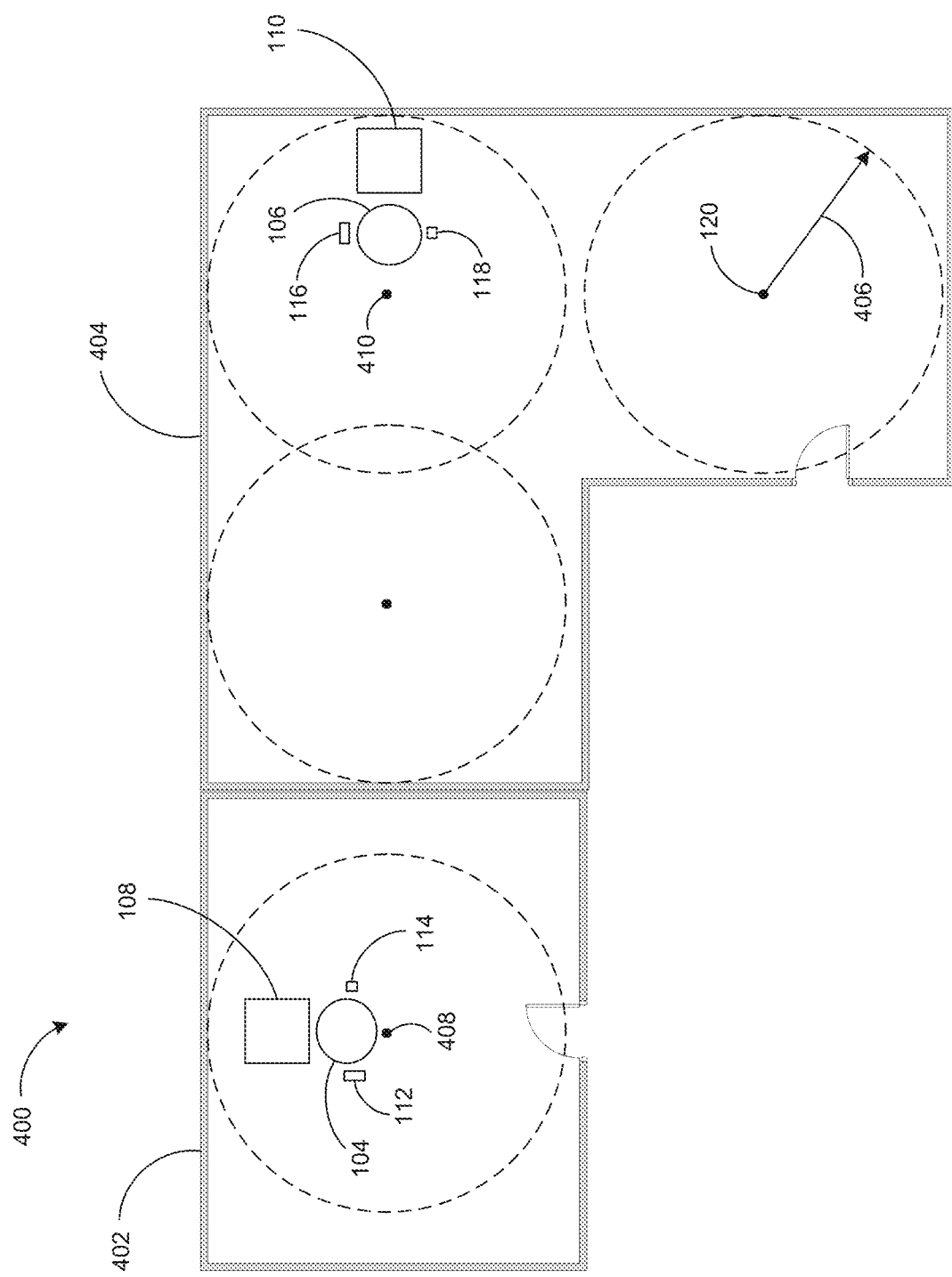
FIG. 4 is a schematic diagram of a physical location at which the transaction processing system of FIG. 1 may be implemented, according to an example embodiment.

FIG. 4 is a schematic diagram of a physical location 400 at which the transaction processing system 100 of FIG. 1 may be implemented, according to an example embodiment. The physical location 400 may be an office building, retail store, manufacturing plant, warehouse, campus, etc. In the example illustrated in FIG. 4, the physical location 400 includes a first office 402 and a second office 404. As further illustrated in FIG. 4, the first user 104, the first computing device 108, the first mobile device 112, and the first wearable device 114 are located in the first office 402. The second user 106, the second computing device 110, the second mobile device 116, and the second wearable device 118 are located in the second office 404.

The plurality of beacons 120 are positioned throughout the physical location 400. Each of the plurality of beacons 120 broadcasts a unique beacon identifier at a broadcast radius 406. The broadcast radius 406 of each beacon 120 may be varied by altering a broadcast power of each beacon 120. Although not shown in FIG. 4, the broadcast radius 406 may be a non-circular broadcast zone formed by placing the beacon 120 in a signal-shaping device (e.g., a partial enclosure formed of material impermeable to radio frequency transmission).

Any of the devices of FIG. 4, including the first and second computing devices 108, 110, the first and second mobile devices 112, 116, and the first and second wearable devices 114, 118 may receive or detect the beacon identifiers from one or more of the plurality of beacons 120. For example, as shown in FIG. 4, one or more of the first computing device 108, the first mobile device 112, and the first wearable device 114 may detect a first beacon identifier from a first beacon 408 of the plurality of beacons 120. In addition, one or more of the second computing device 110, the second mobile device 116, and the second wearable device 118 may detect a second beacon identifier from a second beacon 410 of the plurality of beacons 120.

The computing system 102 (FIG. 1) may receive the detected beacon identifiers from the respective devices in various ways. In one example embodiment, a detected beacon identifier is transmitted by a device to the computing system 102 in connection with a transaction initiation request or a transaction approval response. In another example embodiment, a detected beacon identifier is transmitted by a device to the computing system 102 in response to a beacon identifier request from the computing system 102. In a further example embodiment, a detected beacon identifier is transmitted by a device to the computing system 102 on a rolling periodic basis.

Figure 5:
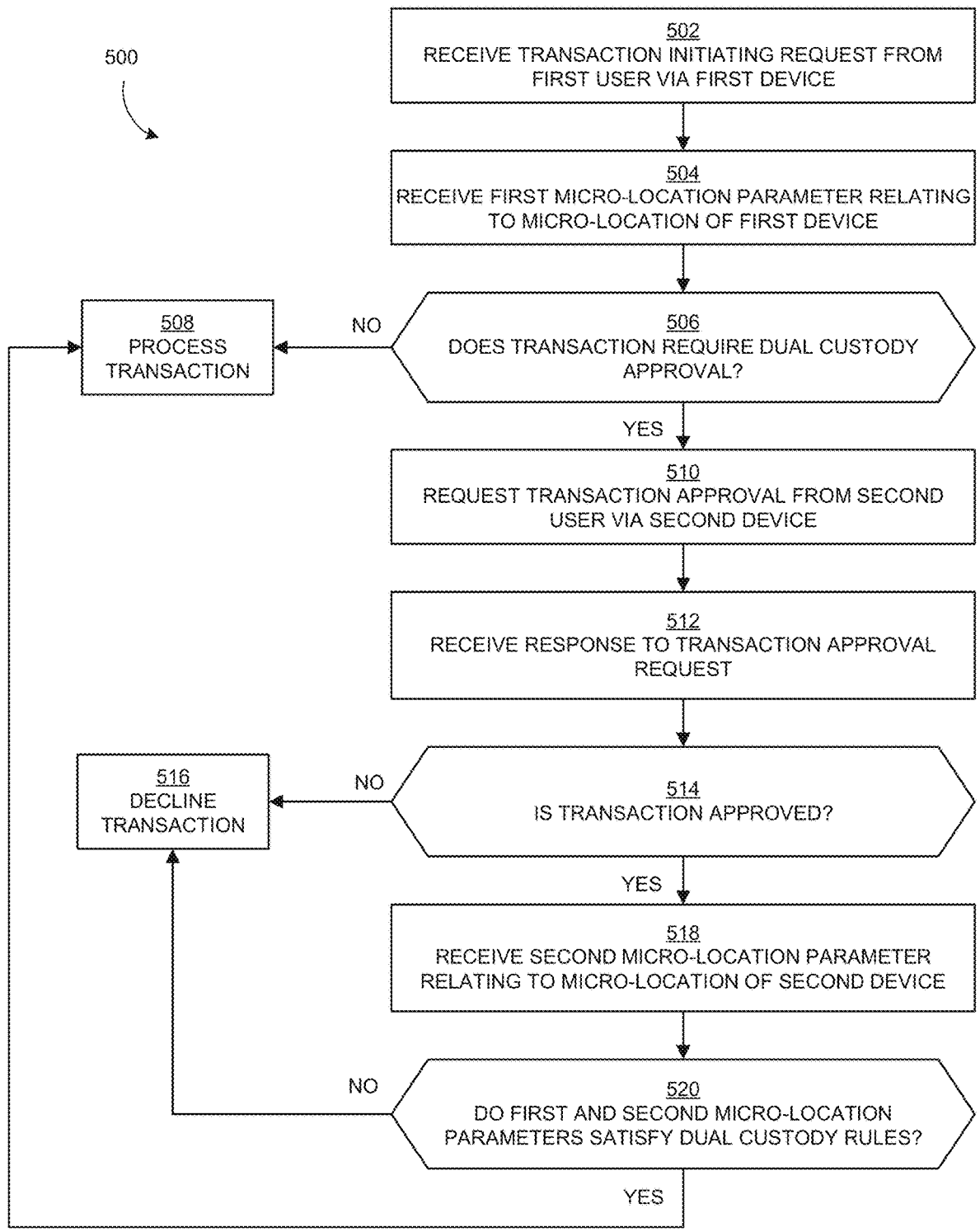
FIG. 5 is a flow diagram of a method of verifying dual custody approval of a transaction, according to an example embodiment.

FIG. 5 is a flow diagram of a method 500 of verifying dual custody approval of a transaction, according to an example embodiment. For clarity and brevity, the method 500 is discussed below in connection with the transaction processing system 100 of FIG. 1. More specifically, the method 500 may be performed by the computing system 102 of the transaction processing system 100 of FIG. 1. However, it should be understood that the method 500 may be performed by other systems and devices.

At 502, a transaction initiation request is received from the first user 104 via the first computing device 108. Alternatively, the transaction initiation request may be received from the first user 104 via the first mobile device 112 or the first wearable device 114. According to various example embodiments, the transaction initiation request may be a request to perform a payment (e.g., an ACH payment, wire transfer, bill payment, etc.), an administrative changes (e.g., changes to employee records, permissions, access lists, work groups, etc.), or another type of transaction.

At 504, a first micro-location parameter is received. According to various embodiments, the first micro-location parameter is received with the transaction initiation request at 502, or may be received separate from the transaction initiation request. The first micro-location parameter relates to a micro-location of the first computing device 108. The first micro-location parameter may be received from the first computing device 108, from a beacon 120, etc. The first micro-location parameter may include a beacon identifier. For example, the first computing device 108 may have detected the beacon identifier upon being within a certain proximity of the beacon 120. In some example embodiments, the first micro-location parameter includes multiple beacon identifiers. The first micro-location parameter may also include additional data, such as an RSSI value indicating the signal strength associated with a received beacon identifier. In other example embodiments, the first computing device 108 may include program logic to analyze its own location, and the first micro-location parameter may include a location of the first computing device 108. For example, the location of the first computing device 108 may be provided as absolute location coordinates or may be provided as a measurement relative to another object, such as a certain distance from one of the beacons 120.

At 506, the computing system 102 determines whether the transaction specified in the transaction initiation request requires dual custody approval. For example, the dual custody rules 132 may define that only certain types of transactions require dual custody approval. Various factors may define whether dual custody approval is required for a transaction, such as transaction type (e.g., ACH payment, wire transfer, administrative change, etc.), transaction amount, transaction recipient, user credentials, certain access or permission changes, etc.

If the answer to step 506 is "NO" (dual custody approval is not required), at 508, the transaction is processed. Conversely, if the answer to 506 is "YES" (dual custody approval is required), at 510, approval of the transaction initiation request is requested from the second user 106 via the second computing device 110. The particular second user 106 that is contacted for approval may depend on various factors, such as the factors considered at step 506 or other factors.

At 512, a response to the transaction approval request is received from the second user 106 via the second computing device 110. At 514, it is determined if the response received at 512 indicates that the second user 106 approves the transaction approval request. If the answer to step 514 is "NO" (the transaction request was not approved), at 516, the transaction is declined. Conversely, if the answer to 514 is "YES" (the transaction request was approved), the computing system 102 continues to analyze the transaction request.

At 518, a second micro-location parameter is received. According to various embodiments, the second micro-location parameter is received with the response to the transaction approval request at 516, or may be received separate from the response to the transaction approval request. The second micro-location parameter relates to a micro-location of the second computing device 110. Similar to the first micro-location parameter received at 504, the second micro-location parameter may include one or more beacon identifiers and/or other location-based information.

At 520, the computing system 102 determines whether the first and second micro-location parameters satisfy the dual custody requirements. For example, may define that the micro-locations of certain devices utilized by users in connection with initiating or approving transactions must be less than or greater than a certain distance from other devices related to the transaction, as described in detail above. If the answer to step 520 is "YES," at 508, the transaction is processed. Conversely, if the answer to step 520 is "NO," at 516, the transaction is declined.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system, comprising:
   a network interface and a processing circuit, the network interface structured to facilitate data communication with a plurality of computing devices and identifiers, the processing circuit comprising a processor and a memory, the processing circuit structured to:
   receive, from a first computing device operated by a first user, a request to conduct a transaction with a merchant;
   request, from a second computing device operated by a second user, approval of the request;
   receive, from the second computing device, approval of the request by the second user;
   responsive to the approval, verify the transaction, wherein verification comprises:
      receiving a first identifier relating to a location of the first computing device;
      receiving a second identifier relating to a location of the second computing device;
      determining a first distance between the first computing device and the second computing device based on the first identifier and the second identifier;
      determining that the first distance between the first computing device and second computing device satisfies a first predetermined distance threshold;
      receiving a third identifier relating to a location of a third computing device, the third computing device being associated with the first user;
      determining a second distance between the third computing device and the first computing device based on the third identifier and the first identifier; and
      determining that the second distance between the third computing device and the first computing device satisfies a second predetermined distance threshold; and
   approve the transaction based on i) the determination that the first distance between the first computing device and second computing device satisfies the first predetermined distance threshold, and ii) the determination that the second distance between the third computing device and the first computing device satisfies the second predetermined distance threshold.

2. The system of claim 1, wherein the first identifier is included in the request, and wherein the second identifier is included in the approval of the request.

3. The system of claim 2, wherein the first identifier is periodically rotated to different values based on a stored private key.

4. The system of claim 2, wherein the processing circuit is structured to receive, in connection with the first identifier, a signal strength indicator relating to a signal strength associated with receiving the first identifier.

5. The system of claim 1, wherein the processing circuit is structured to deny the transaction in response to a predetermined interval of time elapsing prior to receiving the second identifier.

6. The system of claim 1, wherein the request includes a transaction amount, wherein the request for approval from the second user is omitted based on the transaction amount being lower than a predetermined value, and wherein the transaction is approved based on i) the determination that the first distance between the first computing device and second computing device satisfies the first predetermined distance threshold, ii) the determination that the second distance between the third computing device and the first computing device satisfies the second predetermined distance threshold, and iii) the transaction amount being lower than the predetermined value.

7. The system of claim 1, wherein the request includes a transaction type, wherein the request for approval from the second user is omitted based on the transaction type being a transaction type that is predetermined to be low risk by a provider of the computing system, and wherein the transaction is approved based on i) the determination that the first distance between the first computing device and second computing device satisfies the first predetermined distance threshold, ii) the determination that the second distance between the third computing device and the first computing device satisfies the second predetermined distance threshold, and iii) the transaction type being the predetermined low risk transaction type.

8. The system of claim 1, wherein the processing circuit is structured to:
   determine a velocity of the first computing device and the second computing device; and
   approve the transaction based on i) the determination that the first distance between the first computing device and second computing device satisfies the first predetermined distance threshold, ii) the determination that the second distance between the third computing device and the first computing device satisfies the second predetermined distance threshold, and iii) the velocity of either of the first computing device or the second computing device being less than a predetermined amount.

9. A computing system, comprising:
   a network interface and a processing circuit, the network interface structured to facilitate data communication with a plurality of computing devices and identifiers, the processing circuit comprising a processor and a memory, the processing circuit structured to:
   receive, from a first computing device operated by a first user, a request to conduct a transaction with a merchant;
   request, from a second computing device operated by a second user, approval of the request;
   receive, from the second computing device, approval of the request by the second user;
   responsive to the approval, verify the transaction, wherein verification comprises:
      receiving a first identifier relating to a location of the first computing device;

receiving a second identifier relating to a location of the second computing device;

determining a first distance between the first computing device and the second computing device based on the first identifier and the second identifier;

determining that the first distance between the first computing device and second computing device satisfies a first predetermined distance threshold;

receiving a third identifier relating to a location of a third computing device, the third computing device being associated with the second user;

determining a second distance between the third computing device and the second computing device based on the third identifier and the second identifier; and determining that the second distance between the third computing device and the second computing device satisfies a second predetermined distance threshold; and approve the transaction based on i) the determination that the first distance between the first computing device and second computing device satisfies the first predetermined distance threshold, and ii) the determination that the second distance between the third computing device and the second computing device satisfies the second predetermined distance threshold.

10. The system of claim 9, wherein the first identifier is included in the request, and wherein the second identifier is included in the approval of the request.

11. The system of claim 10, wherein the first identifier is periodically rotated to different values based on a stored private key.

12. The system of claim 10, wherein the processing circuit is structured to receive, in connection with the first identifier, a signal strength indicator relating to a signal strength associated with receiving the first identifier.

13. The system of claim 9, wherein the processing circuit is structured to deny the transaction in response to a predetermined interval of time elapsing prior to receiving the second identifier.

14. The system of claim 9, wherein the request includes a transaction amount, wherein the request for approval from the second user is omitted based on the transaction amount being lower than a predetermined value, and wherein the transaction is approved based on i) the determination that the first distance between the first computing device and second computing device satisfies the first predetermined distance threshold, ii) the determination that the second distance between the third computing device and the first computing device satisfies the second predetermined distance threshold, and iii) the transaction amount being lower than the predetermined value.

15. The system of claim 9, wherein the request includes a transaction type, wherein the request for approval from the second user is omitted based on the transaction type being a transaction type that is predetermined to be low risk by a provider of the computing system, and wherein the transaction is approved based on i) the determination that the first distance between the first computing device and second computing device satisfies the first predetermined distance threshold, ii) the determination that the second distance between the third computing device and the first computing device satisfies the second predetermined distance threshold, and iii) the transaction type being the predetermined low risk transaction type.

16. The system of claim 9, wherein the processing circuit is structured to:

analyze a velocity of the first computing device and the second computing device; and approve the transaction based on i) the determination that the first distance between the first computing device and second computing device satisfies the first predetermined distance threshold, ii) the determination that the second distance between the third computing device and the first computing device satisfies the second predetermined distance threshold, and iii) the velocity of either of the first computing device or the second computing device being less than a predetermined amount.

17. A method, comprising:

receiving, by a computing system and from a first computing device operated by a first user, a request to conduct a transaction with a merchant;

requesting, by the computing system and from a second computing device operated by a second user, approval of the request;

receiving, by the computing system from the second computing device, approval of the request by the second user;

responsive to the approval, verifying, by the computing system, the transaction, wherein verification comprises:

receiving, by the computing system, a first data relating to a location of the first computing device;

receiving, by the computing system, a second data relating to a location of the second computing device;

determining, by the computing system, a first distance between the first computing device and the second computing device based on the first and second data;

determining, by the computing system, that the first distance between the first computing device and second computing device satisfies a first predetermined distance threshold;

receiving, by the computing system, a third data relating to a location of a third computing device, the third computing device being associated with the second user;

determining, by the computing system, a second distance between the third computing device and the second computing device based on the third and second data; and determining, by the computing system, that the second distance between the third computing device and the second computing device satisfies a second predetermined distance threshold; and approving, by the computing system, the transaction based on i) the determination that the first distance between the first computing device and second computing device satisfies the first predetermined distance threshold, and ii) the determination that the second distance between the third computing device and the second computing device satisfies the second predetermined distance threshold.

18. The method of claim 17, wherein the first data comprises a first identifier, the second data comprises a second identifier, and the third data comprises a third identifier.

19. The method of claim 18, wherein the first identifier is a first beacon identifier identifying a first beacon communicably coupled to the first device.

20. The method of claim 18, wherein the processing circuit is structured to receive, in connection with the first identifier, a signal strength indicator relating to a signal strength associated with receiving the first identifier.

* * * * *